US007689307B2

(12) United States Patent
Terada

(10) Patent No.: US 7,689,307 B2
(45) Date of Patent: Mar. 30, 2010

(54) DIGITAL AUDIO MIXER

(75) Inventor: Kotaro Terada, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 754 days.

(21) Appl. No.: 11/510,303

(22) Filed: Aug. 25, 2006

(65) Prior Publication Data

US 2007/0067055 A1 Mar. 22, 2007

(30) Foreign Application Priority Data

Sep. 5, 2005 (JP) ............................ 2005-256453

(51) Int. Cl.
*G06F 17/00* (2006.01)
*H04B 1/00* (2006.01)

(52) U.S. Cl. ........................................ 700/94; 381/119

(58) Field of Classification Search .................. 700/94; 381/119, 56, 63; 369/1-12
See application file for complete search history.

(56) References Cited

U.S. PATENT DOCUMENTS 5,054,077 A 10/1991 Suzuki

FOREIGN PATENT DOCUMENTS

JP 03-058351 3/1991
JP 2000-040345 A 2/2000

OTHER PUBLICATIONS

PM5D Digital Mixing Console, PM5d/PM5D-RH Owner's Manual, Copyright 2004.*

PM5D Digital Mixing Console, PM5D/PM5D-RH Owner's Manual, Yamaha Corporation, Japan, http://www2.yamaha.co.jp/manual/pdf/pa/japan/mixers/PMdDJ1.pdf, pp. 72-28, 2004.

Yamaha (2004). PM5D Digital Mixing Console: PM5D/PM5D-RH Owner's Manual, front and back cover, pp. 6-9 (Table of Contents) and pp. 72-78 (13 pages).

Notice of Reason for Rejection mailed Oct. 20, 2009, for JP Application No. 2005-256453, with English Translation, nine pages.

* cited by examiner

*Primary Examiner*—Andrew C Flanders
(74) *Attorney, Agent, or Firm*—Morrison & Foerster LLP

(57) ABSTRACT

In a digital audio mixer, a link group assigner assigns one or a plurality of link groups exclusively to channels of the digital audio mixer. An operating data setter sets a value of an operating data element for each of concerned channels to the same value when the operating data element is placed in a link state and when the same link group is assigned to the concerned channels. An operating data changer operates when a value of an operating data element of one channel is changed to a specific value and when the operating data element is placed in the link state, for changing a value of a corresponding operating data element of another channel belonging to the same link group as the one channel to the specific value. An image data output unit displays a screen containing graphic symbols representing the respective channels. Graphic symbols representing channels belonging to different link groups are represented in different display forms, and graphic symbols representing channels that do not belong to any link group are represented in a common display form, which is different from the display forms of the graphic symbols representing the channels belonging to the link groups.

7 Claims, 10 Drawing Sheets

DIGITAL AUDIO MIXER

BACKGROUND OF THE INVENTION

1. Technical Field of the Invention

The present invention relates to a digital audio mixer that has a plurality of channels and that controls operating states such as audio volume levels, signal characteristics, and the like of digitalized audio signals of channels according to a plurality of operating data values set for each of the channels and then mixes and outputs the audio signals.

2. Description of the Related Art

In a known audio mixer, signal levels of some groups belonging to a group called DCA group are collectively increased and decreased by manipulating a group master fader (DCA fader) while maintaining the relationship among the signal levels of the grouped channels (see Non-Patent Reference 1).

A channel can be assigned to a desired DCA group by depressing a selection (SEL) switch of the channel and depressing a selection switch of the DCA group. Here, it is possible to select a plurality of desired DCA groups. In a DCA group assignment mode, a desired channel can be assigned to a DCA group by depressing a selection switch of the DCA group and depressing a CUE switch of the desired channel. Here, it is possible to select a plurality of desired channels.

However, the user cannot determine the gain of each channel simply by viewing the position of a fader of each channel, but must read numerical values on the display unit to determine the gain of each channel.

In another known audio mixer, a group of operators that can be manipulated in conjunction with each other for channels associated with each other is set, and, if any channel fader in the group is manually operated, faders of other channels are forced to follow the operated channel fader via motor driving while maintaining the balance among the channels set immediately before the manual operation (see Patent Document 1).

In this audio mixer, it is possible to adjust gains of a group of channels and also to know (or determine) the gains of the channels using the positions of their channel faders. However, the gain of each channel must be individually checked.

In any prior art described above, it is difficult to determine channels to which a given group is assigned, particularly when a plurality of groups are present.

A digital audio mixer described in Non-Patent Document 1 (P. 76 and 77) has functions called an "equalizer link (EQ LINK)" and a "compression link (COMP LINK)".

The following is a description of an example of the EQ link. The EQ link is a function to link equalizer (EQ) parameters of a plurality of channels. Simply manipulating an EQ parameter of one of the channels of the same group allows EQ parameters of all the other channels to follow the same value.

Accordingly, if a link group is formed, the values of specific parameters used to control channels of the link group become equal to each other. Even if a parameter value of any channel is changed thereafter, parameter values of other channels belonging to the same link group are kept equal to each other.

Thus, the user only has to check a parameter value of one of the channels belonging to the link group, without the need to individually confirm values of the other channels of the same link group.

The group assignment is performed by displaying an assignment screen for each parameter. The assignment screen has a matrix form with a horizontal axis representing channel numbers and a vertical axis representing link group numbers. Channels which are to be assigned to a group can be linked to each other by displaying marks at intersections between the group and the channels. A "SET BY CUE" button is disposed for each group, and channels to be assigned to the group can be selected by selecting the SET BY CUE button and selecting the channels using their CUE switches.

When other channels have already been assigned to the link group, the same value of EQ parameters of the previously assigned channels is copied to an EQ parameter of a channel that is subsequently added to the group, so that the values of all the channels of the group are set equal.

However, the parameter link group in the above-mentioned prior art is simply a group of partial parameters that are linked to each other, without taking into consideration that multiple types of parameters are linked on a channel-by-channel basis. Particularly, gains that are adjusted using fader operators are grouped into a different type of group, i.e., a DCA group as described above.

Thus, when there is a need to assign a link group for multiple types of parameters, the assignment setting screen must be changed for each parameter, so that the assignment is troublesome.

In addition, channel numbers are arranged simply in the horizontal direction on the link group assignment screen. Thus, it is difficult to determine the relationship between the channel numbers and the channel strips on the panel. In order to select a channel by depressing a switch on a corresponding channel strip, it is necessary to first locate the channel strip.

Further, group numbers are arranged simply in the vertical direction. Therefore, if the number of groups is increased, it is difficult to determine the association between groups and channels since channels belonging to a single group are not necessarily adjacent to each other.

[Patent Reference 1] Japanese Patent No. 2630651, and corresponding U.S. Pat. No. 5054077.

[Non-Patent Reference 1] Yamaha Corporation, "PM5D/PM5D-RH manual", "online", (c) 2004, "searched on July 2005 (Heisei 17)", Internet <http://www2.yamaha.co.jp/manual/pdf/pa/japan/mixers/PM5DJ1. pdf>p.72-74.

SUMMARY OF THE INVENTION

Therefore, the present invention has been made in view of the above problems, and it is an object of the present invention to provide a digital audio mixer that makes it easy to set a link group and to confirm operating data when changing values of operating data of a plurality of channels in conjunction with each other.

In accordance with a first aspect, the present invention provides a digital audio mixer having a plurality of channel strips disposed on a panel in correspondence to a plurality of channels for controlling each of the channels according to a plurality of operating data elements which are set for each of the channels and which are placed in either of a link state or a non-link state. The inventive digital audio mixer comprises: switches mounted on the respective channel strips of the channels disposed on the panel, each of the switches being used to select a corresponding one of the channels; a link group assigner that assigns one or a plurality of link groups exclusively to channels of the plurality of the channels, wherein, if another switch is manipulated for selecting another channel while one switch alone is being manipulated for selecting one channel, the link group assigner assigns a new link group to said one channel and said another channel provided that said one channel and said another channel have not belonged to any link group, the link group assigner assigns a link group, to which said one channel belongs, to said another channel provided that said one channel and said another channel have belonged to different link groups, and the link group assigner assigns no link group to said another channel provided that said one channel and said another channel have belonged to the same link group; an operating data setter that sets a value of an operating data element of said another channel to the same value of a corresponding operating data element of said one channel when the operating data element is placed in the link state and when the link group assigner assigns the same link group to said one channel and said another channel; and an operating data changer operative when a value of an operating data element of one channel is changed to a specific value and when the operating element is placed in the link state, for changing a value of a corresponding operating data element of another channel belonging to the same link group as said one channel to the specific value.

Since a link group is assigned to channels, it is possible to simply set a link group regardless of the number of operating data elements that are enabled linkage. For operating data which is enabled linkage, once an operating data value of one channel is confirmed, there is no need to additionally confirm values of other channels belonging to the same link group. It is possible to assign a link group to channels and to release the assignment alternately by manipulation of switches disposed on corresponding channel strips, so that the manipulation is simple and it is easy to learn how to manipulate.

In accordance with a second aspect, if the link group assigner assigns the link group to which said one channel belongs, to said another channel when said another channel has belonged to a different link group, the link group assigner releases the assignment of the different link group to said another channel. Accordingly, exclusive link group assignment can be performed by manipulating switches disposed on the channel strips.

In accordance with a third aspect, the inventive digital audio mixer further comprises: a display unit disposed on the panel; and an image data output unit that displays, on the display unit, a screen containing a plurality of graphic symbols representing the respective channel strips, displayed in the same arrangement as the channel strips arranged on the panel, wherein graphic symbols representing channel strips of channels belonging to different link groups are represented in different display forms, and wherein graphic symbols representing channel strips of channels that do not belong to any link group are represented in a common display form, which is different from the display forms of the graphic symbols representing the channel strips of the channels belonging to the link groups.

Miniatures of the physical channel strips are displayed on the display unit in the form of graphic symbols. This makes it easy to determine the association between the channel strips and the plurality of channel image symbols, so that it is easy to locate a switch to select a desired channel when assigning a link group to the channel.

Since the graphic symbols representing channel strips of different groups have different display forms (for example, different colors, luminance, shapes, patterns), it is possible to determine at a glance channels which belong to the same group and which can be controlled in conjunction with each other.

In accordance with a fourth aspect, the inventive digital audio mixer further comprises: a display unit disposed on the panel; an image data output unit that displays, on the display unit, an individual link setting screen when a channel is selected by manipulating a switch, the individual link setting screen containing graphic elements representing operating data elements which are placed in the link state for a link group assigned to the selected channel, the individual link setting screen further containing graphic elements representing operating data elements which are placed in the non-link state in a different display form from the graphic elements of the operating data elements which are placed in the link state; and an individual link setter that sets the operating data elements in either of the link state and the non-link state according to a manipulation on the individual link setting screen displayed on the display unit through the image data output unit.

Accordingly, operating data which are placed in the link state can be set independently for each link group. By manipulating one switch mounted on each channel strip, it is possible to specify channels, to which a link group is to be assigned, and also to specify a link group for individual link setting in order to set whether to enable or disable linkage for each operating data.

In accordance with a fifth aspect, the present invention provides a digital audio mixer having a display used for controlling a plurality of channels according to values of a plurality of operating data elements which are set for each of the channels and which are placed in either of a link state or a non-link state. The inventive digital audio mixer comprises: a link group assigner that assigns one or a plurality of link groups exclusively to channels of the plurality of the channels; an operating data setter that sets a value of an operating data element for each of concerned channels to the same value when the operating data element is placed in the link state and when the same link group is assigned to the concerned channels through the link group assigner; an operating data changer operative when a value of an operating data element of one channel is changed to a specific value and when the operating data element is placed in the link state, for changing a value of a corresponding operating data element of another channel belonging to the same link group as said one channel to the specific value; and an image data output unit that displays on the display a screen containing a plurality of graphic symbols representing the respective channels, wherein graphic symbols representing channels belonging to different link groups are represented in different display forms, and wherein graphic symbols representing channels that do not belong to any link group are represented in a common display form, which is different from the display forms of the graphic symbols representing the channels belonging to the link groups.

Since a link group is initially assigned to channels, it is possible to simply set a link group regardless of the number of operating data elements that are placed in the link state. Values of the same operating data of channels belonging to the same group are kept equal to each other. Therefore, once an operating data value of one channel is confirmed, there is no need to additionally confirm values of other channels belonging to the same link group. Since graphic symbols arranged respectively for channel strips of different groups have different display forms, it is possible to determine at a glance which channels belong to the same group. Thus, even when a plurality of link groups are set, it is possible to identify channels belong to each group due to the different display forms.

In the digital audio mixer according to the present invention, when operating data values of a plurality of channels are changed in conjunction with each other, it is easy to set a link group even if a large number of operating data values are changed in conjunction with each other. Since operating data values of channels belonging to the same link group are kept equal to each other, the user only needs to confirm an operating data value of one channel belonging to the link group.

DETAILED DESCRIPTION OF THE INVENTION

Figure 1:
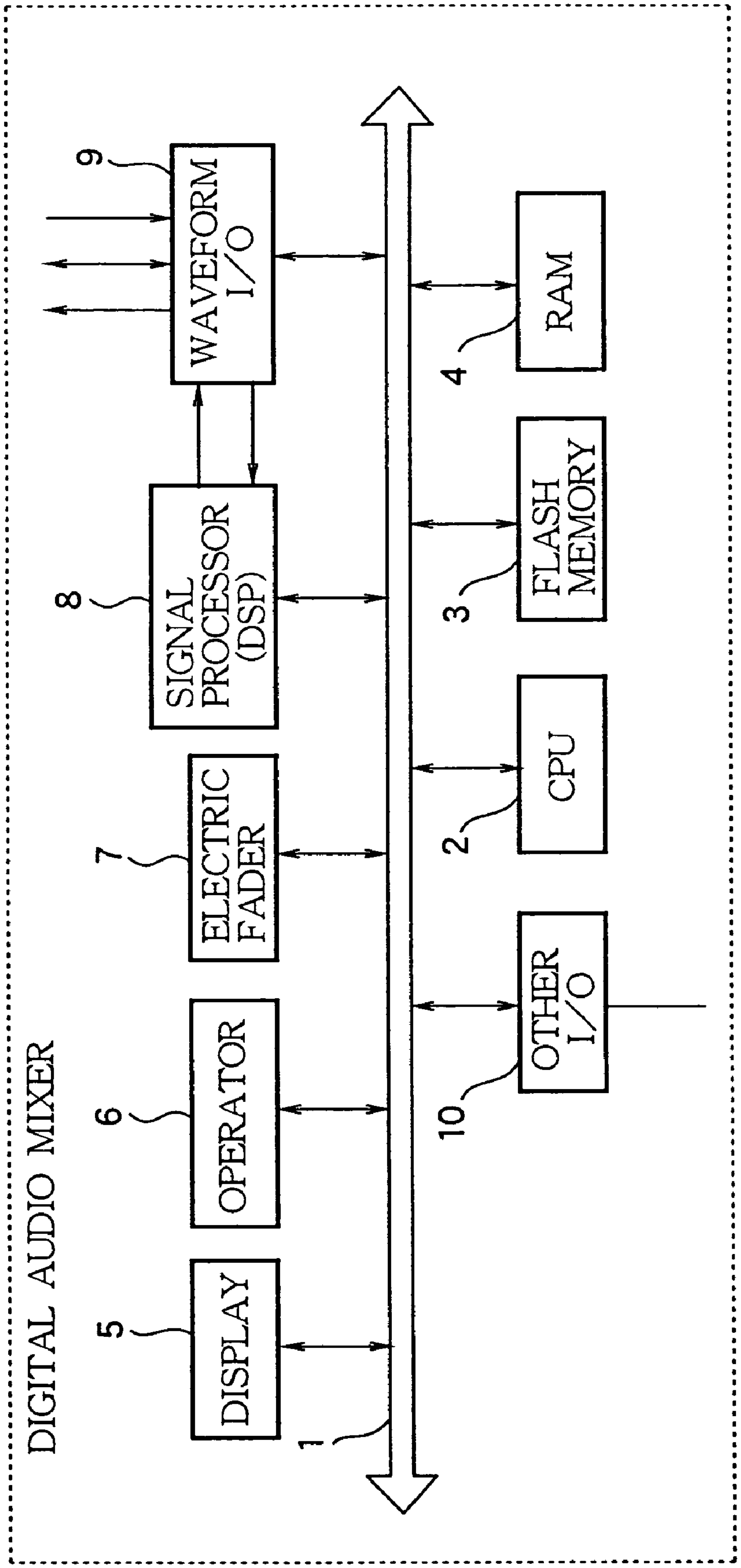
FIG. 1 is a block diagram illustrating an example hardware configuration of a digital audio mixer according to an embodiment of the present invention.

FIG. 1 is a block diagram illustrating an example hardware configuration of a digital audio mixer according to an embodiment of the present invention.

In FIG. 1, reference numeral "1" denotes a bus and "2" denotes a Central Processing Unit (CPU). "3" denotes a flash memory that is rewritable and maintains control program or preset data even if the power is off.

The CPU 2 uses a Random Access Memory (RAM) 4 as a work area and runs a control program to control the entirety of the digital audio mixer including a signal processor 8.

Reference numeral "5" denotes a display unit, examples of the display unit include a liquid crystal display provided on a panel or a light emitting diode (LED) mounted on an operator or the panel to indicate an operating state. "6" denotes operators, examples of which include mechanical switches and knobs mounted on the panel. The function of the operators 6 may be realized through a touch manipulation on a display screen of a touch panel that is used as the display unit 5.

"7" denotes electric faders that are provided respectively for a plurality of input channels, a plurality of layer channels, and a plurality of stereo output channels to control the gain of each of the channels. The electric fader is manually operated. In addition, a knob of the electric fader is moved via motor driving according to a set value of the gain.

"8" denotes a digital signal processor (DSP) and "9" denotes a waveform input/output (I/O) interface.

"10" denotes another I/O interface to which, for example, a personal computer is connected to remotely control the digital audio mixer. When another digital audio mixer is connected to the I/O interface 10, it is possible to perform mixing control (digital cascade control) in conjunction with this device (i.e., the digital audio mixer).

A current memory is provided in the RAM 4 to store current set values of the overall functions of this device, including current set values of operation data (parameters) used to control the signal processor 8.

The user manipulates the operators 6 and the electric faders 7 while viewing a screen displayed on the display unit 5. According to the manipulation, the CPU 2 changes the value of a parameter assigned to each operator and writes the changed value to the current memory. The CPU 2 moves image elements displayed on the display unit 5 or switches screens thereof according to the current values of the current memory and the manipulation process.

Here, the CPU 2 realizes respective functions of a link group assigner, an operation data setter, an operation data changer, an individual link group setter, and an image data output unit according to the present invention.

The CPU 2 transfers control data for signal processing such as a multiplier coefficient to the signal processor 8 according to the set values stored in the current memory.

According to manipulations of the variety of operators 6 and electric faders 7, the signal processor 8 performs mixing control or characteristics control on audio signals of a plurality of channels input from the outside through the waveform I/O interface 9 and then outputs resulting signals through the waveform I/O interface 9.

Figure 2:
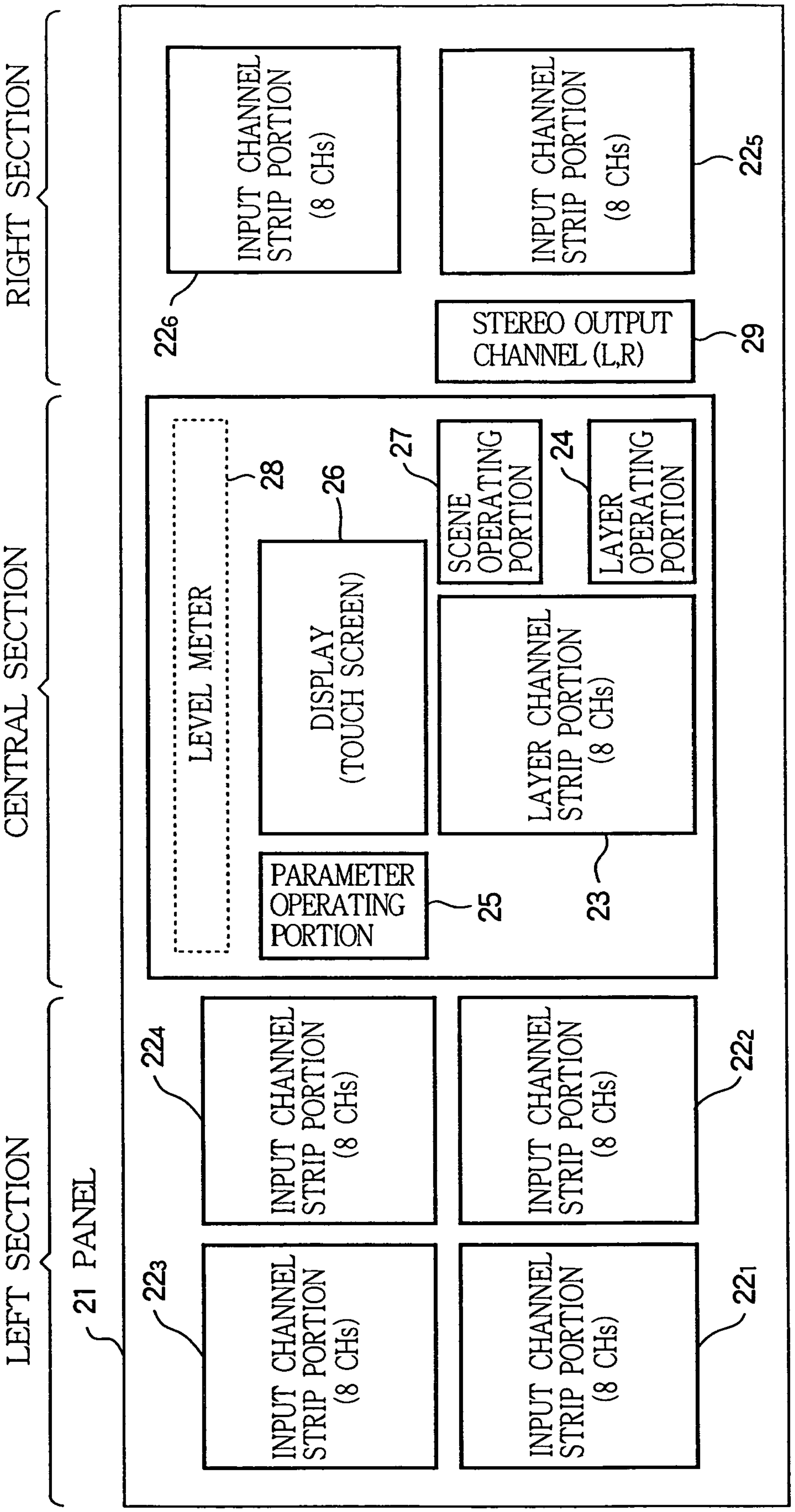
FIG. 2 illustrates the overview of a panel according to an embodiment of the present invention.

FIG. 2 illustrates the overview of a panel 21 according to an embodiment of the present invention.

In FIG. 2, "$\mathbf{22}_1$" to "$\mathbf{22}_6$" denote input channel strip portions on which input channel strips 1-8, 9-16, 17-24, 25-32, 33-40, and 41-48 are arranged, respectively.

"23" denotes a layer channel strip portion that includes 8 channel strips corresponding to one layer. As a layer is selected through a layer operating portion 24, channels assigned to these channel strips are switched to those corresponding to the selected layer.

A layer selectable through the layer operating portion 24 includes not only a layer of input channels (having fixed channel strips) but also a layer of output channels.

"25" denotes a parameter setting portion on which a group of operators are arranged to set a plurality of types of parameters for a channel selected through a selection switch (SEL) mounted on each channel strip or a channel selected using a channel selector in the parameter setting portion 25.

"26" denotes a display unit 5 on which operators other than those provided on the panel 21 are arranged in addition to the same operators as those provided on the panel 21 and on which current set values of parameters corresponding to the operators are displayed.

"27" denotes a scene operating portion that is used to store current values of parameters set through main operators on the panel and other set values as scene data in a scene memory so that the scene data is read to reproduce the operating states as needed.

"28" denotes a level meter that displays output levels of CUE monitors, specified points, or the like in input channels or in mix output channels.

"29" denotes channel strips of stereo output channels.

Figure 3:
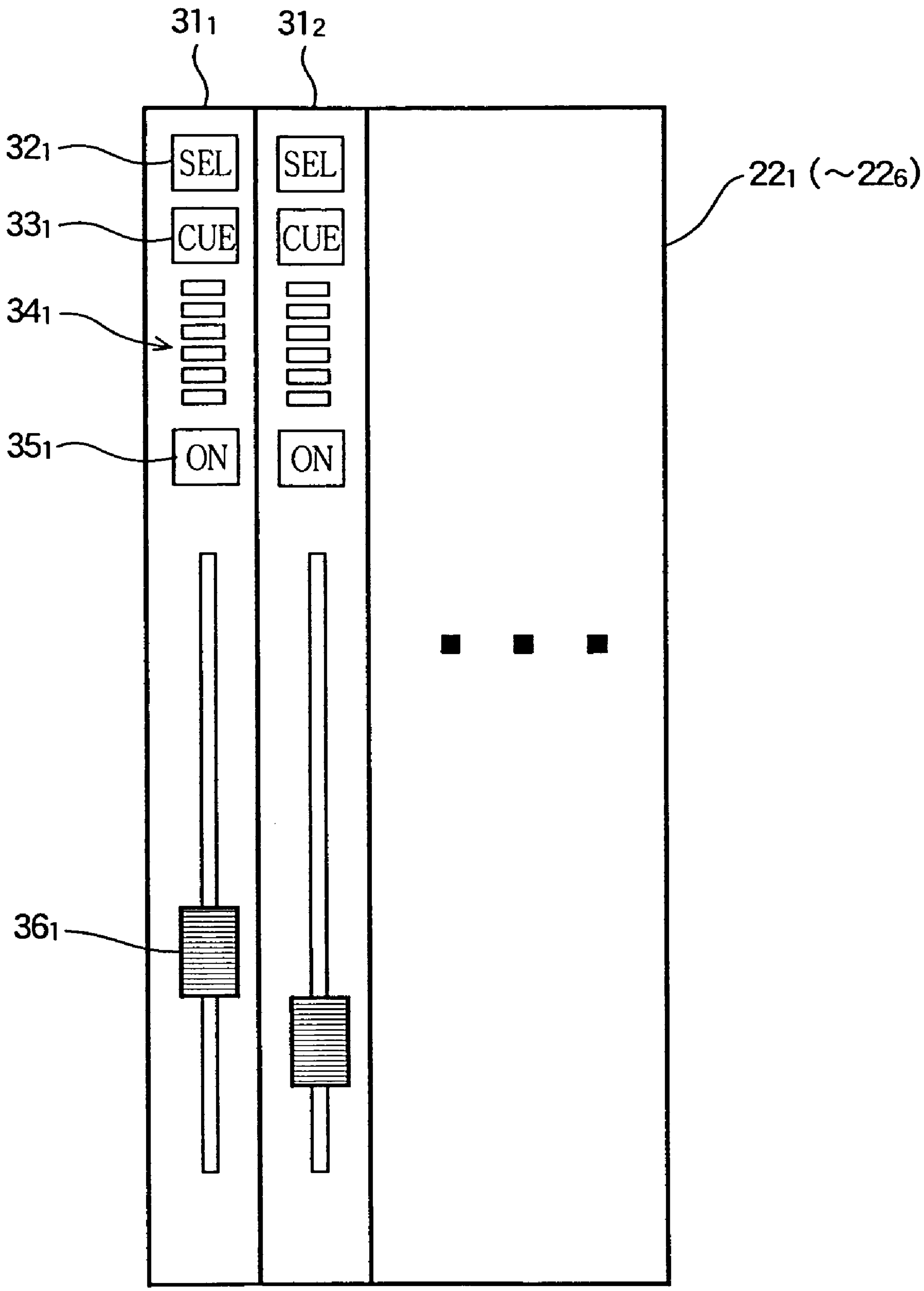
FIG. 3 illustrates the overview of an input channel strip portion shown in FIG. 2.

FIG. 3 illustrates the overview of the input channel strip portion shown in FIG. 2. The following is a description of the input channel strip portion $\mathbf{22}_1$ of Channel 1.

"$\mathbf{32}_1$" denotes a selection switch (SEL) that is used to select a channel to be manipulated through the parameter operating portion 25 of FIG. 2 and is also used to select a channel to which a link group is to be assigned in a link group setting mode in this embodiment.

"$\mathbf{33}_1$" denotes a cue switch (CUE) that is used to select a channel to be temporarily output (or cued) to the monitor for inspection. "$\mathbf{34}_1$" is a level meter of the first channel (Channel 1).

"$\mathbf{35}_1$" denotes a channel on switch (CH ON) that is used to turn on or off an output signal of the first channel to a subsequent bus.

"$\mathbf{36}_1$" denotes an electric fader that is the same as the electric fader 7 shown in FIG. 1. The corresponding gain is determined based on the position of a knob of the electric fader $36_1$. If its set value is changed, the position of the knob is moved to a position via motor driving.

Figure 4:
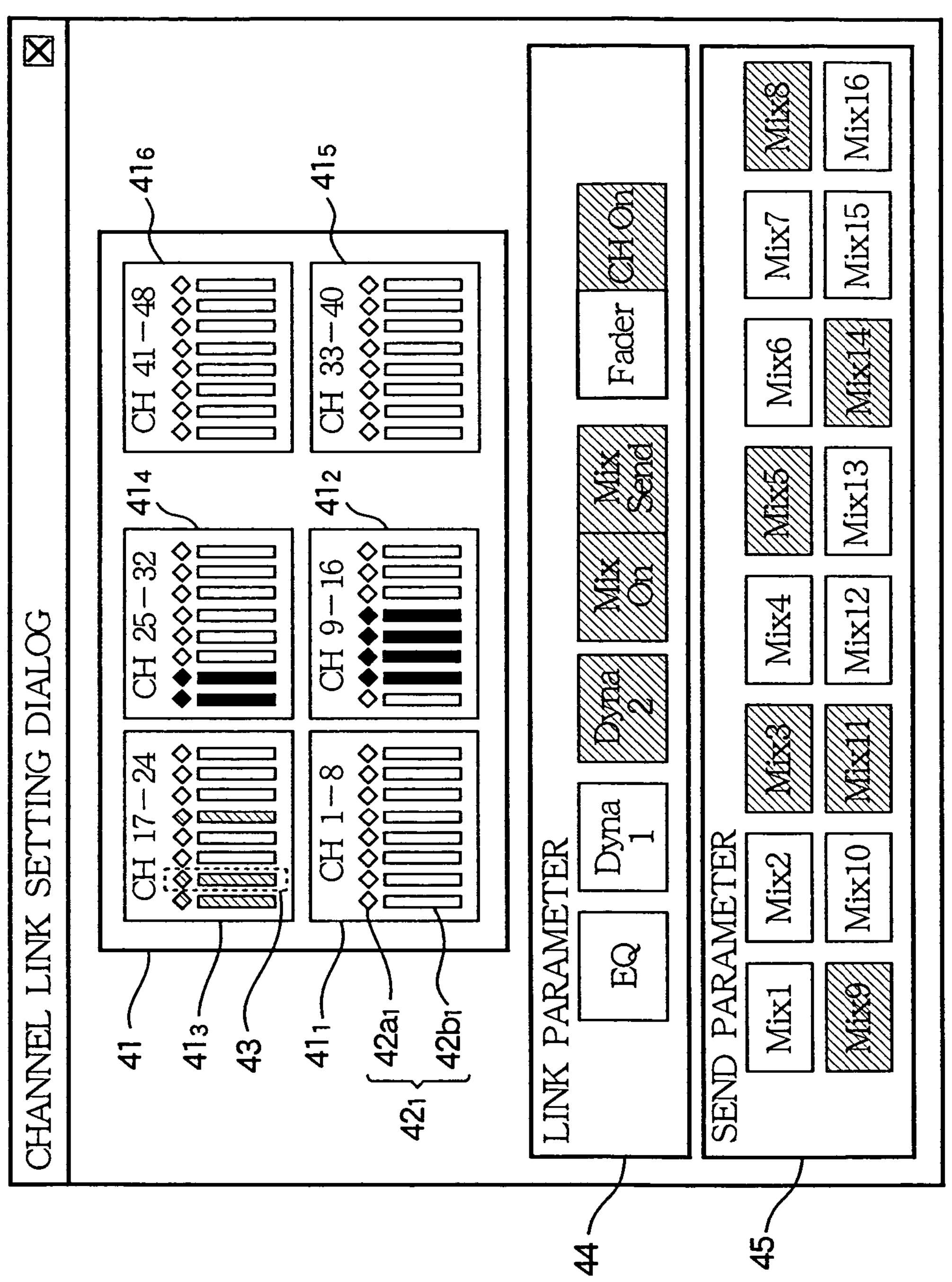
FIG. 4 illustrates a setting screen for display on a display unit when a link group is assigned to channels.

FIG. 4 illustrates a setting screen for display on the display unit 5 when a link group is assigned to channels. This screen is referred to as a channel link group setting screen.

In FIG. 4, "41" denotes a miniature display portion of the input channel strip portion.

All small image elements $42_1$ ($42a_1$, $42b_1$), . . . corresponding to input channel strips $31_1$, $31_2$, . . . shown in FIG. 3, which are arranged on the panel 21 shown in FIG. 2 and which have not been switched to a layer in the input channel strip portions $22_1$ to $22_6$, are arranged in the same way and order as the channel strips $31_1$, . . . arranged on the panel 21.

While it is difficult for the user to know all about the panel 21 since its area is too wide, it is possible to view all input channels simply by seeing an appropriate size screen of the display unit 26.

In the illustrated example, the channel strips $31_1$, . . . are represented by image elements $42_1$, . . . which include diamond-shaped figures $42a_1$, . . . and oblong figures $42b_1$, Generally, the channel strips $31_1$, . . . can be represented by graphic symbols such as the image elements 42 associating the channel strips 31.

"$43_1$" denotes a cursor (or focus) that indicates a channel that the user currently selects using a cursor switch or a mouse (not shown) or the selection switch (SEL).

One or more link groups (1), (2), (3), . . . are exclusively assigned to a plurality of channels. The exclusive link group assignment means that no link group is assigned to a single input channel or that, if a link group is assigned to a single input channel, no other link group is assigned to the single input channel.

The term "link group" refers to a group, similar to the EQ or COMP link described in the related art, that includes a plurality of channels whose parameters (operating data) are controlled while the values of corresponding parameters of the channels are kept equal to each other.

However, in the related art, a link group is assigned to channels for each of partial parameters after each individual parameter is selected.

In addition, if a plurality of link groups is set, in order to edit one of the link groups using a CUE switch, it is necessary to manipulate a "SET BY CUE" button of the link group to be edited before starting the editing.

On the contrary, in the embodiment of the present invention, link groups are collectively assigned for all the channels.

In addition, without additionally manipulating the "SET BY CUE" button to start the editing, a desired one of the link groups is edited simply by manipulating switches each provided for each channel.

Specifically, selection of a link group to be edited or assignment or release of a link group to or from a channel is performed using a type of switch (for example, a selection switch (SEL) $32_1$) from among the selection switches (SEL) $32_1$, . . . , the cue switches (CUE) $33_1$, . . . , and the channel on switches (CH ON) $35_1$ provided on the input channel strips $31_1$, . . . that are arranged respectively for the input channels on the panel 21.

The positions of the selection switches (SEL) $32_1$, . . . to be manipulated can be determined immediately since the image elements 42, . . . are arranged in the same way and order as the channel strips $31_1$, . . . arranged on the panel.

When link groups have been assigned to channels, a plurality of parameters, which enables linkage, among a plurality of parameters (operating data) are set to the same value in channels belonging to the same link group. When the value of a parameter that enables linkage is changed in a given channel, corresponding parameters in other channels belonging to the same link group as assigned to the given channel are changed to the same value as that of the given channel.

In FIG. 4, image elements $42_1$, . . . corresponding to input channels belonging to each link group are represented in a display form (for example, a color, a luminance, a pattern, a shape, or a combination thereof), which is different for each link group. Image elements $42_1$, . . . corresponding to channels not belonging to any link group are represented in the same display form that is different from the display forms of the image elements corresponding to the channels belonging to the link groups.

In the illustrated example, channels ch10-ch13, ch25, and ch26 belong to one link group and channels ch17, ch18, and ch21 belong to another link group. Although image elements or graphic symbols 42 corresponding to different link groups have different forms in the example of FIG. 4, they have different colors in actual products. Channels not belonging to any of the one or more link groups are represented in the same display form that is different from the display forms of the image elements 42 corresponding to the channels belonging to the link groups.

Thus, when a plurality of link groups are formed, channels to which the link groups are assigned and channels to which no link group is assigned can be discriminated as their image elements are displayed in different display forms.

Predetermined display forms representing the one or more link groups are assigned to the link groups sequentially in the order in which the link groups are formed. However, the user may assign arbitrary display forms to the link groups.

Figure 5:
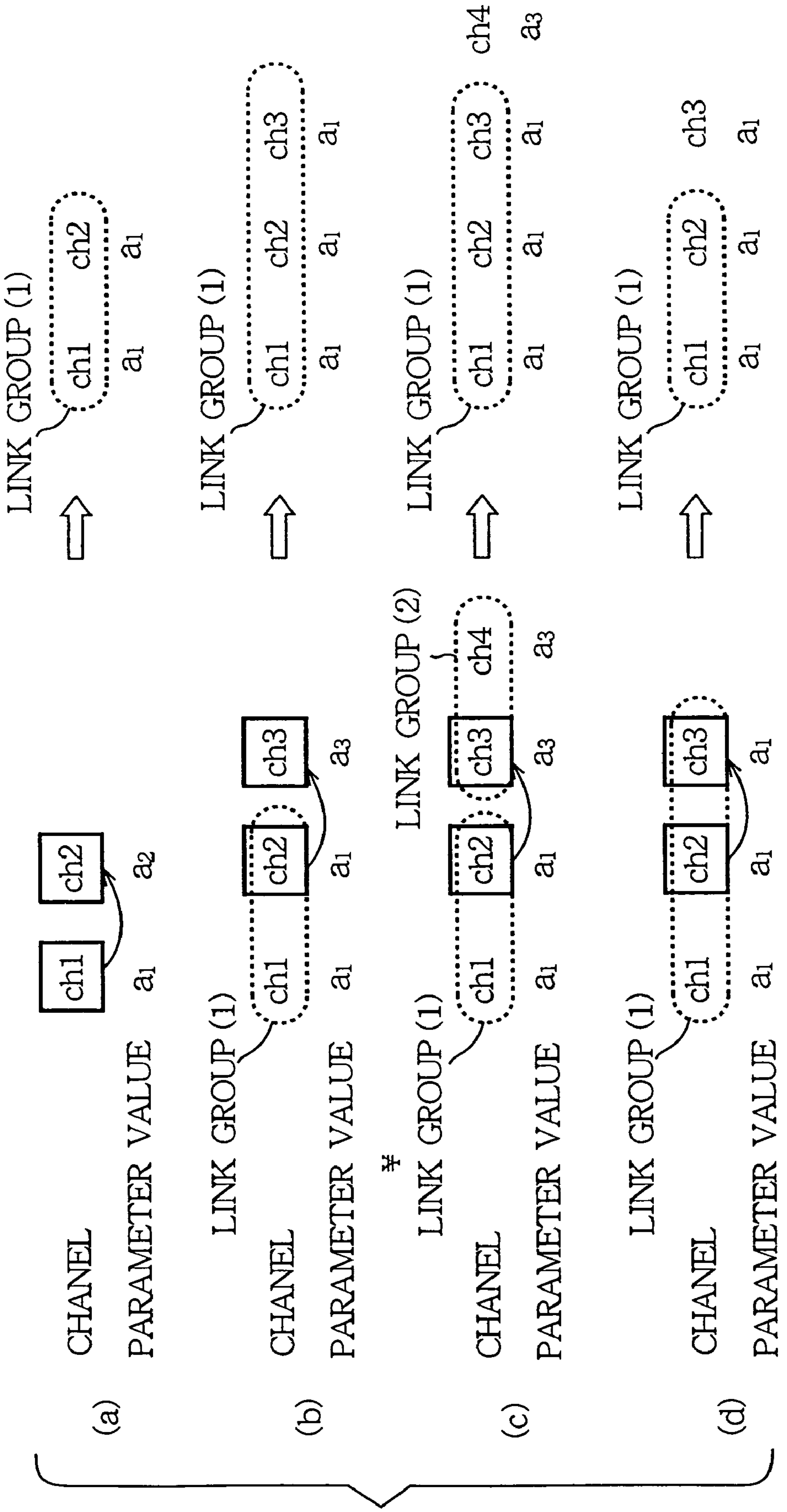
FIGS. 5(*a*)-5(*d*) illustrate detailed examples of a process for assigning exclusive link groups to input channels.

FIGS. 5(*a*)-5(*d*) illustrate detailed examples of a process for assigning exclusive link groups to input channels.

For the exclusive link group assignment, a link group is formed giving priority to a previously selected input channel.

FIG. 5(*a*) illustrates an example where a selection switch $SEL_2$ used to select an input channel ch2 is depressed while a selection switch $SEL_1$ used to select an input channel ch1 is being depressed alone when the input channels ch1 and ch2 do not belong to any link group.

When this depression manipulation is performed, a new link group (1) is formed and the link group (1) is assigned to the input channels ch1 and ch2. Although a parameter value of the input channel ch2 is initially $a_2$, a parameter value $a_1$ of the input channel ch1 is copied to the parameter value of the input channel ch2 to change the parameter value of the input channel ch2 to $a_1$.

Accordingly, the image elements $42_1$ and $42_2$ corresponding to the input channels ch1 and ch2 are displayed in the same display forms in FIG. 4 although they have different display forms until then.

The same effect is achieved even if the above depression manipulation is performed when the input channel ch1 does not belong to any link group and the input channel ch2 belongs to any link group.

FIG. 5(*b*) illustrates an example where a selection switch $SEL_3$ used to select an input channel ch3 is depressed while a selection switch $SEL_2$ (or $SEL_1$) used to select an input channel ch2 (or ch1) is being depressed alone when a link group (1) is assigned to the input channels ch1 and ch2 and the input channel ch3 does not belong to any link group.

At the moment when the selection switch $SEL_2$ (or $SEL_1$) is depressed alone, the link group (1) is selected and the selection switches $SEL_1$ and $SEL_2$ are lit or blink. At the moment when the selection switch $SEL_3$ is depressed, the link group (1) is assigned to the input channel ch3 and the selection switch $SEL_3$ is lit or blinks. Although a parameter value of the input channel ch3 is initially $a_3$, the same parameter value $a_1$ of the input channels ch1 and ch2 is copied to the parameter value of the input channel ch3 to change the parameter value of the input channel ch3 to $a_1$.

FIG. 5(*c*) illustrates an example where a selection switch $SEL_3$ used to select an input channel ch3 is depressed while a selection switch $SEL_2$ (or $SEL_1$) used to select an input channel ch2 (or ch1) is being depressed alone when the input channels ch1 and ch2 belong to a link group (1) and the input channels ch3 and ch4 belong to another link group (2).

At the moment when the selection switch $SEL_2$ (or $SEL_1$) is depressed alone, the link group (1) is selected and the selection switches $SEL_1$ and $SEL_2$ are lit or blink. At the moment when the selection switch $SEL_3$ is depressed, the assignment of the link group (2) to the input channel ch3 is released so that the input channel ch3 is automatically excluded from the link group (2). The link group (1) is assigned to the input channel ch3 and the selection switch $SEL_3$ is lit or blinks. Although a parameter value of the input channel ch3 is initially $a_3$, the same parameter value $a_1$ of the input channels ch1 and ch2 is copied to the parameter value of the input channel ch3 to change the parameter value of the input channel ch3 to $a_1$.

Here, the link group (2) includes only the input channel ch4. Since one channel alone cannot form a group, the assignment of the link group (2) to the input channel ch4 is released so that the link group (2) is automatically destroyed.

FIG. 5(*d*) illustrates an example where a selection switch $SEL_3$ used to select an input channel ch3 is depressed while a selection switch $SEL_2$ (or $SEL_1$) used to select an input channel ch2 (or ch1) is being depressed alone when the input channels belong to a link group (1).

At the moment when the selection switch $SEL_2$ (or $SEL_1$) is depressed alone, the link group (1) is selected and the selection switches $SEL_1$, $SEL_2$, and $SEL_3$ are lit or blink. At the moment when the selection switch $SEL_3$ is depressed, the assignment of the link group (1) to the input channel ch3 is released and the selection switch $SEL_3$ is put out, so that the input channel ch3 does not belong to any link group.

However, the parameter value $a_1$ of the input channel ch3 is maintained thereafter until the parameter value thereof is changed.

When considering this example in conjunction with the example of FIG. 5(*d*), it can be seen that the input channel ch3 belongs to and is released from the link group (1) alternately each time the selection switch $SEL_3$ of the input channel ch3 is depressed while the selection switch $SEL_2$ of the input channel ch2 is being depressed alone.

As described above, the link group assignment has two modes, one in which a link group is initially assigned and the other in which a channel is added to the existing link group. In any assignment mode, an input channel, which has been first depressed and selected, is set as a priority channel and a parameter value of another input channel is set to the same value as a parameter value of the priority channel.

In the above description, it is assumed that link groups are collectively assigned to channels. However, each individual parameter may be previously determined not to be linked or may be arbitrarily set to enable or disable linkage.

That is, each time a selection switch (SEL) 32 is depressed to select an input channel, the cursor (focus) is moved to the selected input channel in the display screen shown in FIG. 4 and an individual link group setting screen 44 associated with a link group assigned to the input channel is displayed at the same time.

The individual link group setting screen 44 displays image elements that represent link target parameters from among a plurality of parameters set for each channel and displays image elements representing parameters which enable linkage and image elements representing parameters which disable linkage in different display modes.

Link target parameters (EQ, dyna1, etc) have been previously determined. For each of the link target parameters, a button (i.e., an image element) is displayed to indicate whether linkage is enabled or disabled.

The display form differs depending on whether linkage is enabled or disabled. In the shown example, a hatched button represents a parameter for which linkage is enabled.

Of all parameters of channels to which the same link group is assigned, parameters for which linkage is enabled are set to the same value.

When a given parameter includes a set of sub-parameters as an equalizer (EQ) parameter described later, sub-parameters to be linked of all the sub-parameters of channels are set to the same value.

Contents of individual parameters will be described later with reference to FIGS. 6 and 7.

While the individual link group setting screen 44 is being displayed, each time the user selects (or clicks) a button using an operator (not shown) such as a switch or a mouse for the link group selected using the selection switch (SEL) 32, linkage of a parameter corresponding to the button is toggled between enable and disable states.

When a channel not belonging to any group is selected, the individual link group setting screen 44 may not be displayed since displaying the screen 44 is meaningless.

Parameters "Mix On" and "Mix Send" displayed on the individual link group setting screen 44 are each a set of sub-parameters. As will be described later with reference to FIGS. 6 and 7, these parameters are defined to set an output mix bus to which a signal of each input channel is output and to set whether or not to enable linkage for the output mix bus. Accordingly, whether linkage of "Mix On" and "Mix Send" parameters is to be enabled or disabled must not be commonly set for all mix buses.

Therefore, a send parameter selection screen 45 is displayed, which includes individual display buttons representing enable/disable states of linkage of "Mix On" and "Mix Send" parameters for all mix buses and the enable/disable states of each display button are switched each time the display button is selected.

In this case, the send parameter selection screen 45 may be displayed only when the "Mix On" and "Mix Send" parameters are valid (or enabled).

Here, if linkage of a parameter (for example, a "Fader" parameter) is switched from a disabled state to an enabled state using the individual link group setting screen 44 while a link group assigned to input channels is not changed, there is a need to decide whether to set a "Fader" value of an input channel belonging to the link group as a "Fader" value common to the link group.

In one method, the "Fader" value of the link group is set to a "Fader" value of a finally selected input channel, i.e., an input channel that has been selected using a selection switch (SEL) 32 to cause the current individual link group setting screen 44 to be displayed. This input channel corresponds to the image element 42 at which the cursor is displayed in the miniature display portion 41 shown in FIG. 4.

In another method, the "Fader" value of the link group may be set to a "Fader" value of a lowest numbered input channel (or a highest numbered input channel) of the input channels belonging to the link group.

Figure 6:
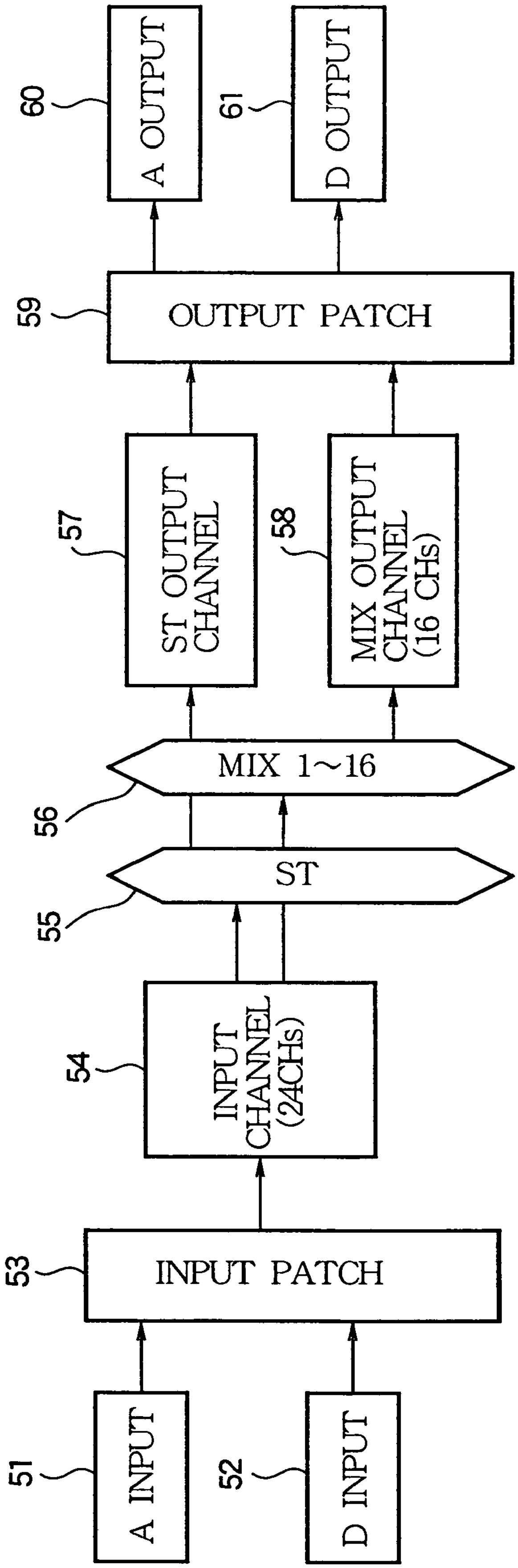
FIG. 6 is a block diagram illustrating functions of a signal processor and a waveform I/O interface unit shown in FIG. 1.

FIG. 6 is a block diagram illustrating functions of the signal processor 8 and the waveform I/O interface unit 9 shown in FIG. 1.

The waveform I/O interface unit 9 corresponds to an analog signal (A) input unit 51, a digital signal (D) input unit 52, an analog signal (A) output unit 60, and a digital signal (D) output unit 61. The signal processor corresponds to the other blocks.

The A input unit has a plurality of input ports that receive and convert analog signals to digital signals. The D input unit has a plurality of input ports that receive and convert digital signals.

An input patch unit 53 selects an input port of those of the A input unit 51 and the D input unit 52 for each input channel portion 54*i* (for example, i=1-48 channels) and provides a connection between the selected input port and the input channel portion 54*i*.

Each input channel portion 54*i* controls characteristics of the input signal and provides its output signal to at least one of stereo output buses 55 and a plurality of mix output buses 56 corresponding to, for example, 1st to 16th channels, so that signals on the buses are mixed.

A signal from the stereo output buses 55 is input to a stereo output channel portion 57 and each signal from the mix output buses 56 is output to a corresponding mix output channel portion 58.

An output hatch unit 59 selects one of an output of the stereo output channel portion 57 and an output of the mix output channel portion 58 for each of a plurality of output ports of an A output unit 60 and a D output unit 61 and provides, for each output port, a connection between the output port and the selected output of the stereo output channel portion 57 and the mix output channel portion 58.

The A output unit 60 converts digital signals of the plurality of ports to analog signals through a D/A converter and outputs the analog signals. The D output unit 61 outputs digital signals of the plurality of ports without alteration.

Figure 7:
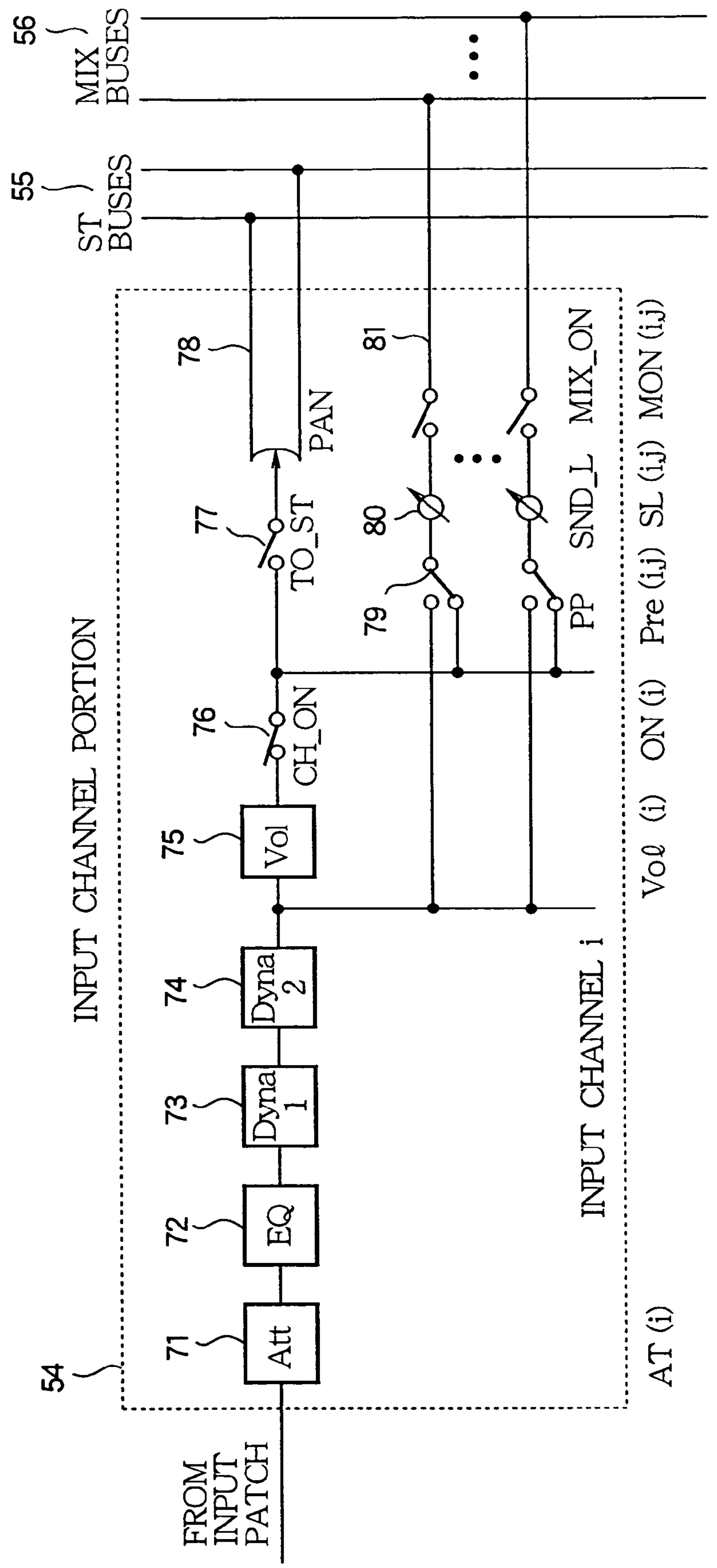
FIG. 7 is a detailed block diagram of an input channel of an input channel portion shown in FIG. 6.

FIG. 7 is a detailed block diagram of an input channel portion 54*i* of the input channel portion 54 shown in FIG. 6.

In FIG. 7, an attenuator (ATT) 71 adjusts the level of an input signal, which corresponds to a parameter name AT(i), and an equalizer 72 adjusts frequency characteristics of the input signal, and then dynamics units (Dyna1, Dyna2) 73 and 74 perform control operations on the input signal such as signal level compression or lower level signal cutoff.

Figure 8:
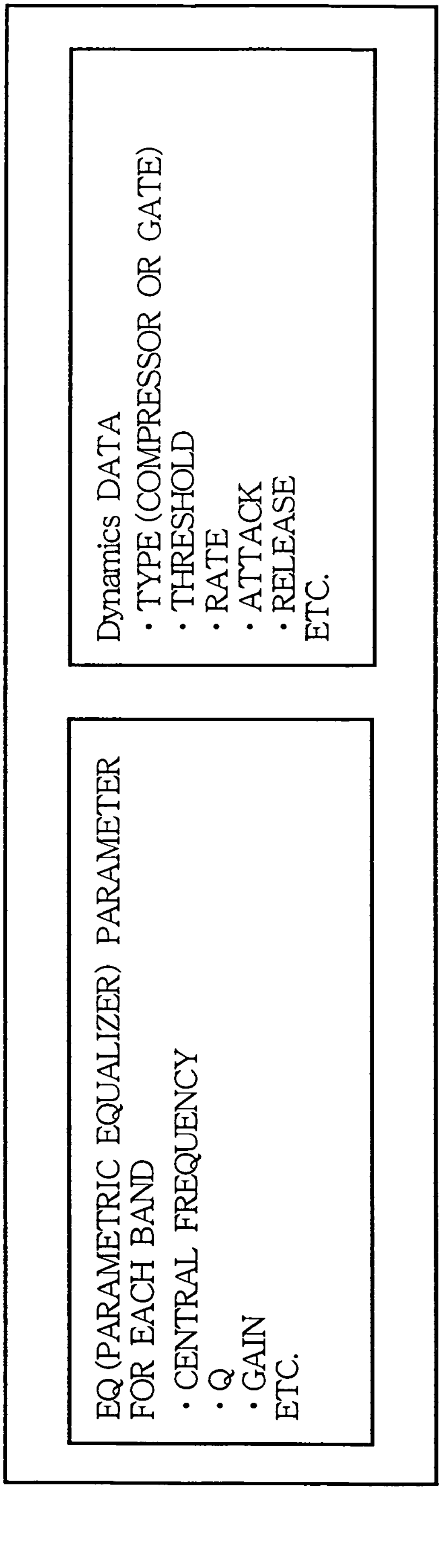
FIG. 8 illustrates sub-parameters of an equalizer parameter and a dynamics parameter shown in FIG. 7.

FIG. 8 illustrates sub-parameters of an equalizer parameter and a dynamics parameter shown in FIG. 7.

The equalizer 72 is a parametric equalizer that sets parameters such as respective central frequencies, Q values, and levels of a plurality of frequency bands. Each of the dynamics units 73 and 74 sets a type (i.e., a compressor function/gate function type), threshold values (i.e., a compression start level and a cutoff start level), a rate (i.e., a compression rate when a high level signal is input), an attack (i.e., a rising edge characteristic for detecting an input signal level), and a release (i.e., a falling edge characteristic for detecting an input signal level).

In FIG. 7, a volume (or level) adjuster (Vol) 44 adjusts the input level through an electric fader ("7" in FIG. 1 and "36" in FIG. 3), which corresponds to a parameter name Vol(i). A channel ON switch (ch ON) 76 turns on/off an output signal of the input channel portion 54*i*, which corresponds to a parameter name ON(i).

A To switch (To_ST) 77 turns on/off the output signal to the stereo buses 55. A pan adjuster (PAN) 78 adjusts the pan.

A mix ON switch 81 turns on/off the output signal to the (1st to 16th) mix buses 56, which corresponds to a parameter name MON(i,j). A send level adjuster (SND L) 80 adjusts a mix send level to each mix bus (j=1-12), which corresponds to a parameter name SL(i,j). A pre/post switch (PP) 79 does or does not connect the dynamics unit (Dyna2) 74 directly to the send level adjuster (SND L) 80, which corresponds to a parameter name Pre(i,j).

The To switch (TO ST) 77, the parameter for setting the pan adjuster (PAN), and the parameter (Pre(i,j)) are not displayed on the individual link group setting screen 44 shown in FIG. 4 since they are originally designed not to be linked.

Parameters of the mix ON switches (MIX ON) and the send level adjusters (SND L) may be linked between channels belonging to the same link group or may be individually set in each of the channels, depending on the purpose of use of the signals to be mixed on the mix buses.

Figure 9:
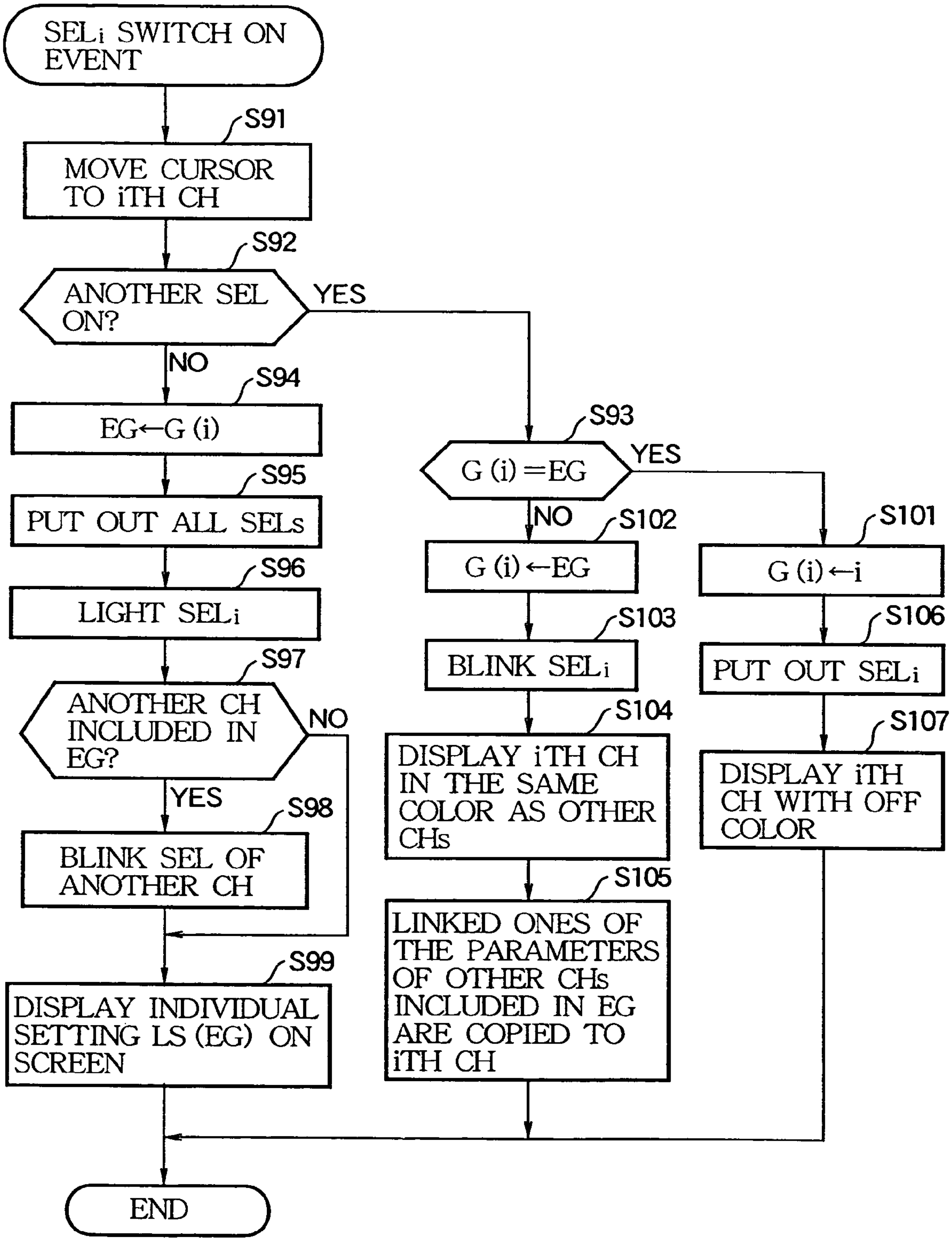
FIGS. 9(*a*) and 9(*b*) are flow charts illustrating an example operation of the embodiment of the present invention.
Figure 9:
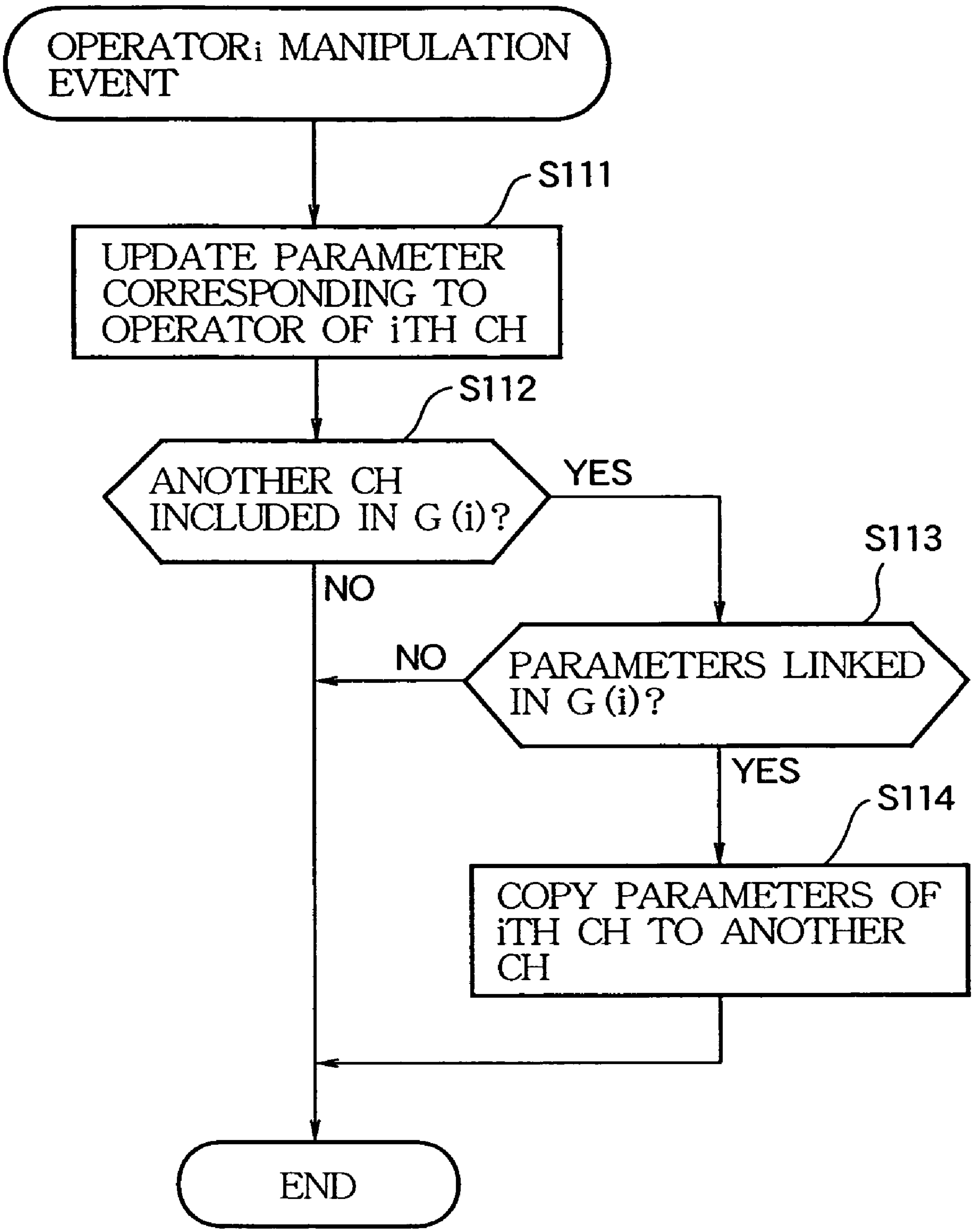

FIGS. 9(*a*) and 9(*b*) are flow charts illustrating an example operation of the embodiment of the present invention. The CPU 1 shown in FIG. 1 realizes each step shown in FIG. 9 by running a parameter setting program.

FIG. 9(*a*) illustrates a process routine that is activated when depression (i.e., an ON event) of the selection switch SELI of the input channel (i) is detected while the channel link setting dialog screen shown in FIG. 4 is opened in the link group setting mode.

At step S91, the cursor is moved to the image element $\mathbf{43}_i$. At step S92, it is determined whether or not another selection switch SEL has been depressed (i.e., is on). If another selection switch SEL is on, the process proceeds to step S93, and, if no other selection switch is on, the process proceeds to step S94.

When the process proceeds to step S94, the value of a group G(i) assigned to the input channel (i) is written to an editing group (EG).

Accordingly, the group G(i), to which the input channel (i) belongs, is selected as an editing target. Here, all input channels belong to groups and the variable G(i) stores the group number of a group to which the input channel (i) belongs.

Numbered groups, assigned to two or more input channels, of a plurality of numbered groups are each a link group and numbered groups assigned to only one input channel are each not a link group since parameters are not linked between channels.

In the following description, when the editing group (EG) is a link group, the editing group is expressed as a link group (EG). Similarly, when the group G(i) is a link group, the link group is expressed as a link group (EG).

For simplifying the process, unique numbers (or different numbers) are set for groups (Gi) by default. For example, the default setting is such that G(i)=i. When the input channel (i) does not belong to any link group, the group G(i) is given a unique number that has been set by default.

At step S95, lamps of all the selection switches SEL are put out and then, at step S96, only the lamp of the selection switch SELi is lit. This informs the user that the input channel (i) is a priority channel.

When any selection switch SEL has not been depressed, only a selection switch of one channel currently selected in the mixer is lit and selection switches of the other channels are all put out.

At step S97, it is determined whether or not at least one other channel belongs to the editing group (EG). If at least one other channel belongs to the editing group (EG), a lamp of a selection switch (SEL) of the channel belonging to the link group (EG) blinks at step S98. This informs the user of which channel belongs to the selected link group. On the other hand, if the determination of step S97 is that no other channel belongs to the editing group (EG), the process proceeds directly to step S99.

The user can perform manipulations for additionally assigning or releasing a link group to or from a channel, which is described above with reference to FIG. 5, while checking which input channels belong to the link group by viewing lit or blinking states of the selection switches (SEL).

As described above, all link groups including the selected link group are displayed in different forms in the setting screen of FIG. 4. Since the arrangement of the lit or blinking selection switches (SEL) on the panel 21 is similar to the arrangement of display elements of the selected link group on the setting screen, the user can immediately determine which group has been selected.

At step S99, an LS of the current editing group (EG) (i.e., the individual link group setting screen 44 and the send parameter selection screen 45) is displayed on the screen shown in FIG. 4. The individual link group setting screen 44 is displayed even when the editing group (EG) is not a link group.

A description of a process routine of the setting operations of the individual link group setting screen 44 and the send parameter selection screen 45 is omitted herein.

On the other hand, if the determination of step S92 is that another selection switch (SEL) has already been depressed (i.e., another priority channel is present), the process proceeds to step S93 to determine whether or not the value of the group G(i) assigned to the input channel (i) is equal to that of the current editing group (EG) which has been assigned to the already depressed selection switch SE at step S94. If the determination of step S93 is YES, the process proceeds to step S101, otherwise the process proceeds to step S102.

If the two groups G(i) and (EG) are different (including the case where any link group has not been assigned to the input channel (i)), the value of the current editing group (EG) is written to the group G(i) to perform new link group assignment or link group change at step S102. Here, when only one channel belongs to the editing group EG before this operation, a new link group EG is created through the assignment or change.

At step S103, a lamp of the selection switch $SEL_i$ blinks. This informs the user that the input channel (i) has been added to the link group (EG).

At step S104, the image element $\mathbf{43}_i$ of the input channel (i) shown in FIG. 4 is displayed in the same color as another channel belonging to the link group (EG).

When a new link group (EG) has been created at step S102, a color, which has not yet been used for display of any other link group, is assigned to the link group (EG) and image elements of all input channels belonging to the link group are displayed in the assigned color at step S104.

At step S105, the values of parameters, for which linkage is enabled, of the parameters of another channel belonging to the link group (EG) are all copied to the corresponding parameters of the input channel (i).

The parameters are stored in the current memory of the RAM 4 and are copied within the current memory.

On the other hand, if the determination of step S93 is that the value of the group G(i) assigned to the input channel (i) is equal to that of the current editing group (EG) which has been assigned at step S94, the process proceeds to step S101 to set the value of the group G(i) assigned to the input channel (i) to its initial value i. That is, the assignment of the link group (EG) is released.

At step S106, the lamp of the selection switch $SEL_i$ is put out. At step S107, an image element of the input channel (i) of the image elements 43 shown in FIG. 4 is displayed "without color" to represent that the input channel (i) is not assigned to any link group.

In the case where the lamp of the selection switch $SEL_i$ has already been lit at step S96, one of the lamps of the selection switches (SEL) of the channels belonging to the current link group (EG) may be switched from a blinking state to a lit state so that any one selection switch (SEL) in the link group (EG) is always lit.

In addition, at step S101, the number of channels belonging to the current link group (EG) may be reduced as the assignment of the link group (EG) to the input channel (i) is released.

In this case, since the group to which only one input channel belongs is no longer a link group, the same processes as steps S101 and S107 are performed on the single input channel (i') so that the assignment of the link group to the input channel (i') is released (G(i')=i') and the color of an image element of the input channel (i') is changed to "colorless".

This allows the user to visually confirm that the selected link group has been destroyed. Here, the selected group (EG) is set to the group G(i') of the input channel (i') while maintaining the lit state of the selection switch (SEL) of the input channel (i') since the selection switch SEL of the input channel (i') has been manipulated alone.

In the process routine of FIG. 9(*a*), initially, when a selection switch (SEL) of an input channel is depressed alone, a link group to which the input channel belongs is selected as the editing group (EG) if such a link group is present and selection switches of input channels belonging to the selected link group are lit or blink. Subsequently, if a selection switch SEL of a different input channel is depressed while the selection switch SEL of the input channel is still depressed, the inclusion of the different input channel in the link group is set/released in a toggle manner, and this change is reflected in the lit or blinking states of the selection switches (SEL) on the panel 21 and the group setting screen displayed on the display unit 5.

A brief description will now be given of a not-shown process routine of an off event of a selection switch (SEL), which is not shown.

When a selection switch (SEL) of an input channel is released (i.e., turned off), the following process is performed, provided that the selection switch (SEL) has been lit (i.e., if the channel has been selected at that time). On the other hand, no specific process is performed if the selection switch (SEL) has been put out or blinking at that time.

First, it is checked whether or not any selection switch (SEL) of another input channel of a group to which the input channel belongs has been depressed. If the selection switch (SEL) of another input channel has been depressed, one input channel in the group is selected, and then a selection switch (SEL) of the selected input channel is lit while causing the selection switch (SEL), which has been lit until then, to blink.

On the other hand, if any selection switch (SEL) of the group to which the input channel belongs has not been depressed at that time, it is checked whether or not a selection switch (SEL) of an input channel of another group, which includes only one channel in this case, has been depressed. If a selection switch (SEL) of an input channel of another group has been depressed, the input channel is selected and the group is set as a selected group. That is, only the selection switch (SEL) of the input channel is lit on the panel 21, and other selection switches (SEL) are put out, and the displayed group setting screen is updated with that of the group.

In addition, if any selection switch (SEL) of any group has not been depressed at that time, the selection switch (SEL), which is turned off at that time, is the last one which is turned off, and therefore a selection switch (SEL) of another input channel in the selected group (EG) is changed from the blinking state to the unlit state, the selected group (EG) is initialized (EG=0), and any group is not selected. The last turned off input channel is still selected and the selection switch (SEL) is kept lit.

FIG. 9(*b*) is a flow chart of a process routine after the link group is set. Here, the screen of FIG. 4 is not shown.

The process of FIG. 9(*b*) is activated upon detecting a manipulation event of an $operator_i$ of an input channel (i).

At step S111, a parameter value, which corresponds to the $operator_i$ and is maintained in the current memory, is changed according to the manipulation.

If a link group G(i) is assigned, i.e., if another channel belongs to the link group G(i) at step S112, the process proceeds to step S113, otherwise the process is terminated.

If linkage is enabled for a parameter corresponding to the $operator_i$ in the link group G(i) at step S113, the process proceeds to step S114 and the value of the parameter of the input channel (i) is copied to the same type of parameters of all other channels belonging to the link group G(i).

As described above, when a selection switch (SEL) of an input channel is manipulated and a link group is thus selected, the manipulated selection switch of the input channel among input channels to which the link group is assigned is lit and selection switches (SEL) of the other input channels blink, thereby allowing the user to visually confirm the priority channel.

However, all selection switches (SEL) of all channels to which the link group belongs may be either lit or blink, which will cause no problem since the user can determine which input channel is a priority one based on a depressed switch.

As described above, a link group is formed only for the channels of the input channel portion 54. However, a link group may also be formed for output channels such as MIX output channels in the same manner.

In the digital audio mixer shown in FIG. 1, the signal processor 8 performs signal processing using the digital signal processor (DSP), and the CPU 1 sets the values of signals processing parameters for the DSP.

However, the signal processor 8 may be provided as an external digital signal processing unit. In addition, the CPU 1 may perform the function of the signal processor 8 without using the DSP. One example is a personal computer that has a mixer function.

Without being limited to real musical sound signals received through a microphone, the input audio signals may include signals created by reproducing audio files or waveform data signals created by inputting a music data file with a sound source. In addition, the mixed signal is not necessarily output through a speaker and may also be recorded.

Without being limited to the independent digital audio mixer, the present invention may be applied to a recorder including the digital audio mixer, a mixer part of audio visual (AV) equipment, a digital mixer-related part of a digital audio workstation (DAW) run on a personal computer with a control surface connected thereto, and the like.

What is claimed is:

1. A digital audio mixer for controlling characteristics of audio signals via a plurality of channels and mixing the audio signals, the digital audio mixer comprising:

a panel on which a plurality of channel strips are disposed in correspondence to the channels, each of the channel strips having controls for controlling parameters of a corresponding one of the channels;

switches, each of which being mounted on each of the channel strips and used to select a corresponding one of the channels;

a link group assigner that assigns one or a plurality of link groups exclusively to channels of the plurality of channels, such that one or none of the link groups is assigned to each of the plurality of channels, in response to manipulation of the switches by a user, wherein, when the user manipulates one of the switches, (1) the link group assigner creates a new link group and assigns the new link group to said one channel and said another channel provided that said one channel has not belonged to any link group, (2) the link group assigner assigns a link group, to which said one channel has belonged, to said another channel provided that said one channel has belonged to a link group and said another channel had not belonged to the link group, and (3) the link group assigner assigns no link group to said another channel provided that said one channel and said another channel had belonged to a same link group;

a parameter setter, operative when the link group assigner assigns a link group same as said one channel to said another channel, that sets values of linked parameters among the parameters of said another channel to the same values of the linked parameters among the parameters of said one channel; and a parameter changer, operative when a value of a linked parameter of one channel belonging to a link group is changed to a specific value, that changes a value of the linked parameter of another channel belonging to the same link group as said one channel to the same specific value.

2. The digital audio mixer according to claim 1, wherein, in a case when the link group assigner assigns a link group to said another channel belonging to a different link group, the link group assigner automatically releases the assignment of the different link group to said another channel.

3. The digital audio mixer according to claim 1, further comprising:

a display unit disposed on the panel; and an image data output unit that displays, on the display unit, a plurality of graphic symbols representing the respective channel strips, disposed in the same arrangement as the channel strips arranged on the panel, wherein graphic symbols of channels belonging to each of the link groups are represented in a display form corresponding to the link group, the display form being different for each link group, and wherein graphic symbols representing channel strips of channels not belonging to any link group are represented in a particular common display form, which is different from any of the display forms corresponding to the link groups.

4. The digital audio mixer according to claim 1, further comprising:

a display unit disposed on the panel;

an image data output unit that displays, on the display unit, an individual link setting screen when a channel is selected by manipulating one of said switches, the individual link setting screen containing graphic elements, each corresponding to one or more of the parameters, and representing a link state of the one or more parameters corresponding to the graphic element, whether the one or more parameters are linked or not between channels, in a link group assigned to the selected channel; and an individual link setter, operative when any of the graphic elements on the individual link setting screen is manipulated, that toggles the link state of the one or more parameters corresponding to the manipulated graphic element displayed on the individual link setting screen, between a linked state and a non-linked state, in a link group assigned to the selected channel.

5. A digital audio mixer for controlling characteristics of audio signals via a plurality of channels and mixing the audio signals, the digital audio mixer comprising a panel on which a display unit and a plurality of channel strips in correspondence to the channels are disposed, each of the channel strips having controls for controlling parameters of a corresponding one of the channels, the digital audio mixer comprising:

a link group assigner that assigns one or a plurality of link groups exclusively to channels of the plurality of channels, such that one or none of the link groups is assigned to each of the plurality channels;

an individual link setter that sets each of the parameters in one of a linked state and a non-linked state selectively:

a parameter setter, operative when a link group is assigned to concerned channels among the plurality of channels, that equalizes values of linked parameters between the concerned channels in the link group;

a parameter changer operative when a value of a parameter of one channel belonging to a linked group is changed to a specific value, that changes a value of the parameter of another channel belonging to the same link group to the specific value if the parameter is in the linked state; and an image data output unit that displays, on the display unit, a plurality of graphic symbols representing the respective channel strips, disposed in the same arrangement as the channel strips arranged on the panel, wherein graphic symbols of channels belonging to each of the link groups are represented in a display form corresponding to the link group, the display being different for each link group, and wherein graphic symbols representing channel strips of channels not belonging to any link group are represented in a particular common display form, which is different from any of the display forms corresponding to the link groups.

6. A method of operating a digital audio mixer comprising a plurality of channel strips disposed on a panel in correspondence to a plurality of channels, each of the channel strips having controls for controlling parameters of a corresponding one of the channels, the digital audio mixer further comprising switches, each of which being mounted on each of the channel strips, and used to select a corresponding one of the channels, the method comprising:

assigning one or a plurality of link groups exclusively to channels of the plurality of channels, such that one or none of the link groups is assigned to each of the plurality of channels, in response to manipulation of the switches by a user, wherein, when the user manipulates one of the switches and manipulates another of the switches while keeping the manipulation of the one switch, (1) a new link group is created and assigned to said one channel and said another channel provided that said one channel has not belonged to any link group, (2) a link group to which said one channel has belonged is assigned to said another channel provided that said one channel has belonged to a link group and said another channel had not belonged to the link groups, and (3) no link group is assigned to said another channel provided that said one channel and said another channel had belonged to a same link group;

when a link group same as the one channel is assigned to the another channel, setting values of linked parameters among the parameters of said another channel to the same values of the lined parameters among the parameters of said one channel; and when a value of a linked parameter of one channel belonging to a link group is changed to a specific value, changing a value of the linked parameter of another channel belonging to the same link group as said one channel to the same specific value.

7. A method of operating a digital audio mixer having a display for controlling a plurality of channels according to values of a plurality of linked parameters which are set for each of the channels, the method comprising:

assigning one or a plurality of link groups exclusively to channels of the plurality of the channels, such that one or none of the link groups is assigned to each of the plurality of channels, in response to manipulation of switches mounted on each of a plurality of channel strips on a panel of the digital audio mixer by a user, wherein, when the user manipulates one of the switches and manipulates another of the switches while keeping the manipulation of the one switch, (1) a new link group is created and assigned to said one channel and said another channel provided that said one channel has not belonged to any link group, (2) a link group to which said one channel has belonged is assigned to said another channel provided that said one channel has belonged to a link group and said another channel had not belonged to the link groups, and (3) no link group is assigned to said another channel provided that said one channel and said another channel had belonged to a same link group;

setting values of the linked parameters for each of concerned channels to the same value when the same link group is assigned to each of the concerned channels;

when a value of a linked parameter of one channel belonging to a link group is changed to a specific value, changing a value of the linked parameter of another channel belonging to the same link group as said one channel to the same specific value; and displaying on the display a screen containing a plurality of graphic symbols representing the respective channels, wherein graphic symbols representing channels belonging to each of the link groups are represented in a display form corresponding to the link group, the display form being different from each link group, and wherein graphic symbols representing channels not belonging to any link group are represented in a particular common display form, which is different from any of the display forms corresponding to the link groups.

* * * * *